United States Patent [19]

Perkins

[11] 4,240,474
[45] Dec. 23, 1980

[54] BAG HOLDER AND COLLECTOR CONSTRUCTION

[76] Inventor: Harold W. Perkins, 781 Ray Ave. NW., New Philadelphia, Ohio 44663

[21] Appl. No.: 52,070

[22] Filed: Jun. 25, 1979

[51] Int. Cl.³ .............................................. B65B 1/06
[52] U.S. Cl. .................................. 141/231; 141/314; 141/317; 141/367; 248/101
[58] Field of Search .......... 141/10, 114, 231, 313–317, 141/391, 367; 232/43.2; 248/98–101

[56] References Cited

U.S. PATENT DOCUMENTS

| | | | |
|---|---|---|---|
| 339,665 | 4/1886 | Krure | 141/314 X |
| 1,554,550 | 9/1925 | Berger | 141/314 X |
| 1,862,413 | 6/1932 | Malicay | 141/231 X |

Primary Examiner—Frederick R. Schmidt
Attorney, Agent, or Firm—Frease & Bishop

[57] ABSTRACT

An improved bag holder and collector for receiving grass clippings, leaves, etc., in a top hopper for discharge into a collection bag removably mounted below the hopper. The hopper is formed by a pair of downwardly inwardly sloping end walls and a pair of vertical side walls which terminate with a rectangular-shaped horizontal bottom wall. A circular discharge opening is provided in the center of the bottom wall, with the remaining portion of the bottom wall forming a flat shelf area surrounding the opening. A cylindrical collar is mounted beneath the bottom hopper wall concentric with the discharge opening. Clamping ring means removably mounts a collection bag on the collar for receiving the materials discharged through the hopper opening. The hopper is supported between a pair of upstanding end panels having wheels attached to the bottoms thereof for movably supporting the hopper. The combination of the flat shelf area which surrounds the circular discharge opening, the configuration of the hopper walls, and the size of the discharge opening has been found to sufficiently restrain the grass clippings in the hopper to reduce the free fall of the clippings through the discharge opening during the replacement of a collection bag without requiring any shut-off mechanism.

6 Claims, 9 Drawing Figures

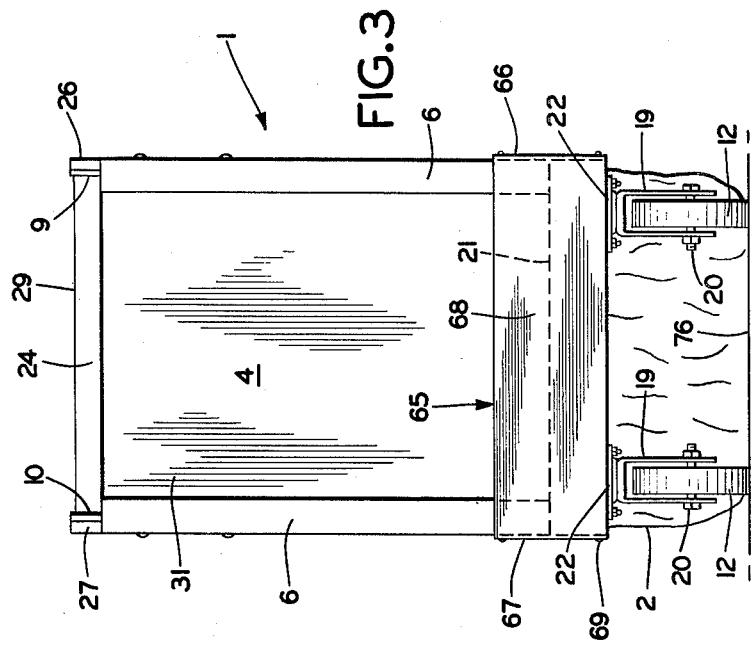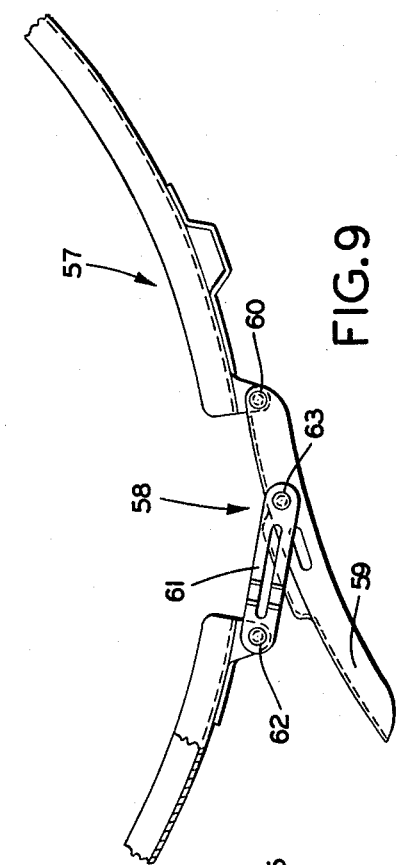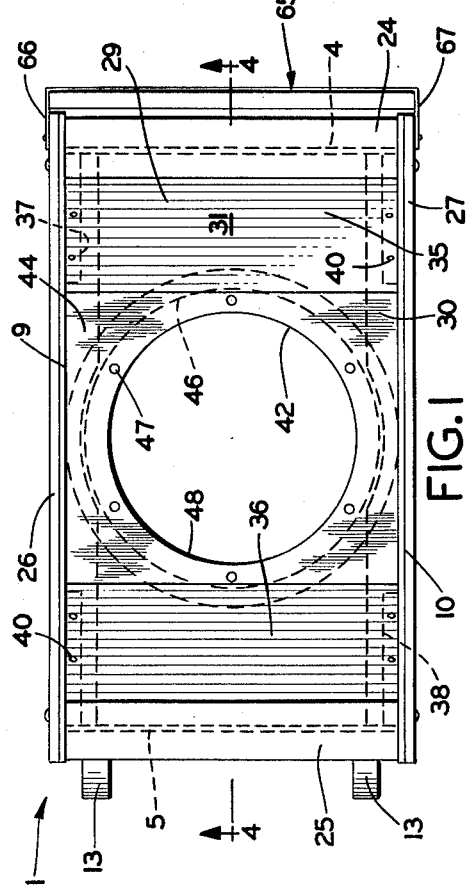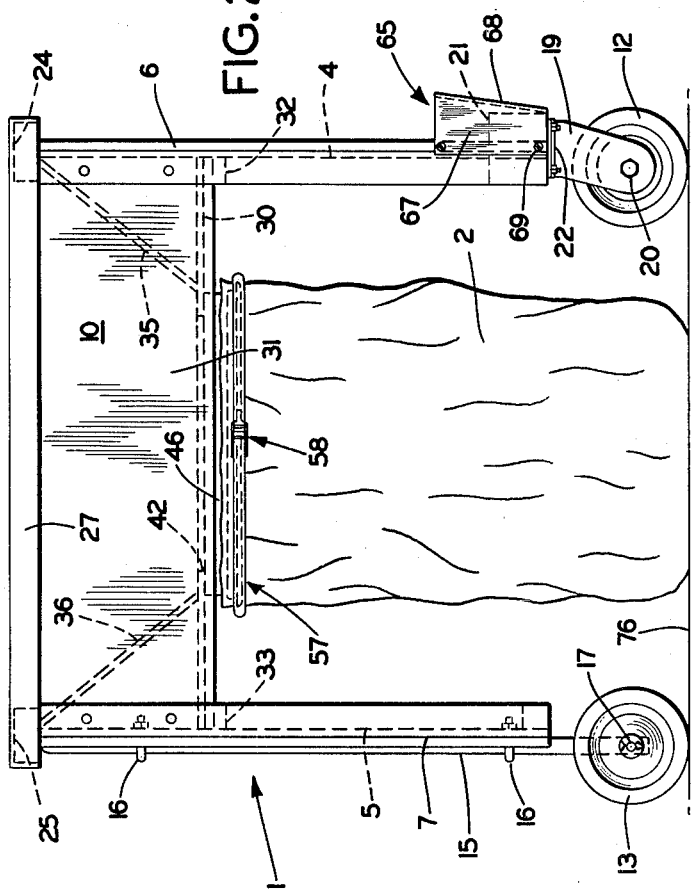

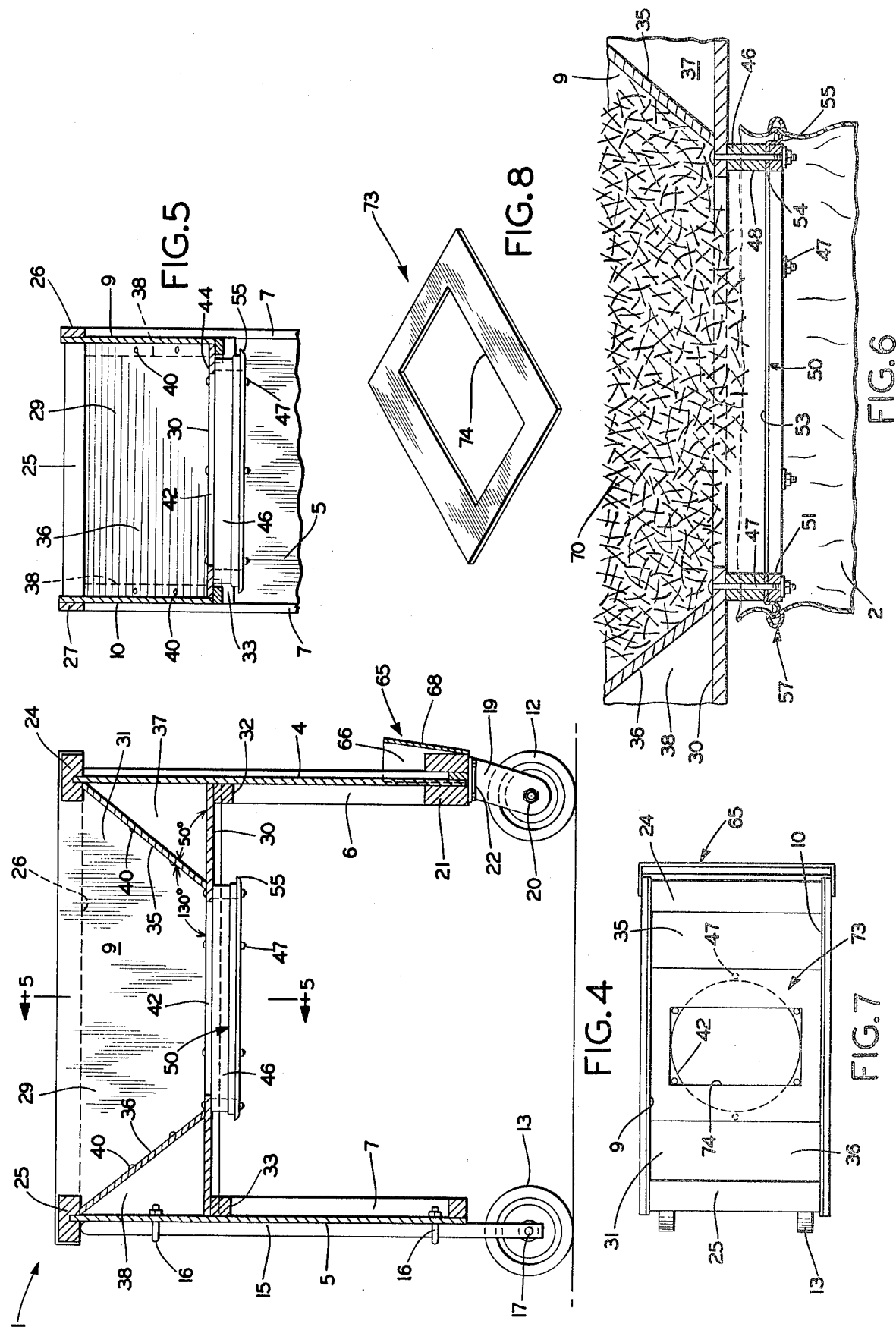

BAG HOLDER AND COLLECTOR CONSTRUCTION

BACKGROUND OF THE INVENTION

1. Field of the Invention

The invention relates to devices for removably holding a refuse bag in combination with a collector chamber for receiving debris for discharge into the bag. More particularly, the invention relates to an improved device which is provided with an upper hopper for receiving grass clippings, leaves, etc., beneath which a collection bag is removably mounted for receiving the clippings through a discharge opening formed in the bottom of the hopper, and in which the grass clippings will remain in the hopper while the bag is replaced, without any closing or restraining mechanism being required to close the discharge opening.

2. Description of the Prior Art

There are numerous styles and constructions of devices on which a bag is removably mounted for receiving debris or refuse such as grass clippings, leaves, small twigs and branches, etc., to facilitate lawn care. Many of these devices have sloped hoppers into which the debris is dumped for discharge into the bag. Also, such devices are mounted on wheels to facilitate their movement across the lawn to collection and bag deposit areas. Some examples of these prior bag holder and collector devices are shown in U.S. Pat. Nos. 122,685, 189,202, 275,086, 362,807, 1,862,413, 2,140,199 and 2,455,729.

It is believed that some of these prior devices perform satisfactorily for their intended purpose. However, many of these devices merely provide a means for holding a bag in an opened position for discharge of the various materials directly into the top bag opening. Also, some of these constructions do not provide suitable means for easily and quickly mounting a collection bag on the holder, especially for use with the plastic-type refuse bags currently being used today for lawn care.

Many of the lawn mowers in use today have large collection containers or grass catchers mounted on the rear thereof, especially the riding type of mower. These containers hold a relatively large amount of grass clippings than the heretofore usual bag-mounted container on the small push-type mowers. The emptying of these large mower-mounted grass collectors into the known types of bag holders provides a problem in that these collectors may contain more grass clippings than can be received in a single collection bag. This requires filling the one bag that is mounted on its holder from the mower collector and then installing another bag for the remainder of the collector contents. All of this takes additional lifting, raising and emptying steps on the part of the user. Even if the bag holder and collector device is provided with a hopper for receiving the grass clippings for channeling them into a bag mounted below, additional difficulties are encountered since the clippings will fall through the opening onto the ground during replacement of the bag.

One type of bag holder and filling mechanism, shown in U.S. Pat. No. 1,554,550, is provided with a shut-off valve to stop the flow of material from the hopper during bag replacement. This valve is a metal plate which is movable across the discharge opening. Such a valve construction or any similar mechanism would not be suitable for a grass bag holder and collector since it would result in a more expensive and complicated device than the usual homeowner would be likely to purchase, and would require additional manual operations each time the bag is replaced. Also, such valve plates would require maintenance to provide for their smooth operation and would become clogged quickly if used with damp grass, making their use completely unsatisfactory for lawn care purposes.

These prior devices also are difficult to use with the heavier mower-attached grass collectors since when emptying the collector, an individual will need to balance the collector on top of the device to facilitate the dumping of the contents into the hopper and/or bag. The frames of most prior collector devices do not permit the balancing of these large collectors thereon. Another problem that exists with some prior art bag holder and collector devices, especially those having a hopper associated therewith, is the bag attachment means is located at a position not easily accessible, thereby increasing the difficulty of bag replacement. Still another problem with prior art bag holders is that the bag clamping means only supports the bag at several spaced locations about its periphery. Such attachment is satisfactory if the bags are formed of heavy burlap, canvas, or similar materials formerly used for such purposes. However, these prior clamping and mounting means would be completely unsatisfactory for securing the relatively inexpensive and disposable thin-ply plastic bags which are used today for the collecting and disposal of grass clippings, leaves, etc., since the point contact would readily tear the bag.

Accordingly, the need has existed for an improved bag holder and collector construction for use by an individual in the care of his lawn which will securely hold an easily tearable plastic bag in a collecting position beneath a hopper, and in which grass clippings in the hopper will not fall freely through the discharge opening during bag replacement, eliminating the need for any external shut-off mechanism. There is no known construction of which I am aware which enables these results to be achieved in a relatively simple, rugged and inexpensive manner as is accomplished by my bag holder and collector construction.

SUMMARY OF THE INVENTION

Objectives of the invention include providing an improved bag holder and collector construction which has a unique hopper configuration consisting of a pair of sloped end walls and an opposite pair of vertical side walls in combination with a horizontal bottom wall shelf surrounding a circular discharge opening, whereby grass clippings in the hopper will not fall freely through the discharge opening during bag replacement until pushed therethrough by a slight manually applied pressure of the user; providing such an improved construction which securely clamps a plastic bag in an open position completely about the top edge thereof to prevent tearing of the bag when filled with clippings; providing such an improved construction in which a discharge opening adjustment plate may be placed in the hopper to reduce the size of the discharge opening to achieve the desirable feature of retaining the grass clippings in the hopper during bag replacement even when the grass clippings are dry; providing such an improved construction in which a storage compartment is provided on one end of the hopper supporting frame for storing additional grass collection bags; providing such an improved construction which is movably mounted on wheels to enable the device to be rolled easily across the lawn to a convenient location for deposit of the grass clippings therein, in which the bag attachment means is readily accessible for conveniently replacing bags, in which a filled bag is supported on the ground beneath the hopper preventing excess pressure at the point of attachment, and in which the filled bag can be removed easily from beneath the device without the bag being manually lifted from a supporting platform; providing such an improved construction which can be fabricated easily of sheet metal or wood panels to form a rigid structure, whereby the large mower-mounted grass catchers can be balanced on a ledge surrounding the hopper opening when emptying the clippings into the hopper, eliminating the user from manually supporting the entire weight of the hopper while discharging the contents; and providing such an improved bag holder and collector construction which eliminates difficulties heretofore encountered, achieves the stated objectives simply and effectively, and solves problems and satisfies needs existing in the art.

These objectives and advantages are obtained by the improved bag holder and collector construction, the general nature of which may be stated as including a frame; wheels movably supporting the frame; hopper means mounted on the frame for receiving a supply of grass clippings therein, said hopper means having a pair of spaced, downwardly inwardly sloping end walls, a pair of intervening vertical side walls, and a relatively flat horizontal bottom wall with a circular discharge opening being formed in said bottom wall; cylindrical collar means mounted beneath the bottom wall opening for removably mounting a bag on the hopper means for receiving grass clippings discharged through said bottom wall opening; and band means removably mounted on the exterior of the collar means for removably clamping a bag on said collar means.

BRIEF DESCRIPTION OF THE DRAWINGS

A preferred embodiment of the invention—illustrative of the best mode in which applicant has contemplated applying the principles—is set forth in the following description and shown in the accompanying drawings, and is particularly and distinctly pointed out and set forth in the appended claims.

FIG. 1 is a top plan view of the improved bag holder and collector construction;

FIG. 2 is a side elevational view of the improved bag holder and collector construction of FIG. 1, with a collection bag being shown mounted thereon;

FIG. 3 is a right-hand end elevational view of the improved bag holder and collector shown in FIG. 2;

FIG. 4 is a sectional view taken on line 4—4; FIG. 1;

FIG. 5 is a fragmentary sectional view taken on line 5—5, FIG. 4;

FIG. 6 is an enlarged fragmentary sectional view of a collection bag mounted beneath the discharge opening of the hopper, with a pile of grass clippings being shown diagrammatically in the hopper;

FIG. 7 is a reduced top plan view similar to FIG. 1, with a discharge opening adjustment plate mounted on the bottom wall of the hopper;

FIG. 8 is a perspective view of the discharge opening adjustment plate of FIG. 7; and FIG. 9 is an enlarged fragmentary view, with portions broken away and in section, of the bag clamping band shown in open position.

Similar numerals refer to similar parts throughout the drawings.

DESCRIPTION OF THE PREFERRED EMBODIMENT

The improved bag holder and collector construction is indicated generally at 1, and is shown with a bag 2 removably mounted thereon in FIGS. 2 and 3. Construction 1 includes a frame formed by a pair of upstanding end panels 4 and 5 extending between and mounted on spaced pairs of corner braces 6 and 7, respectively. Braces 6 and 7 preferably are formed of 2×4 wood studs or the like, with panels 4 and 5 being formed of plywood sheeting. These end panels and their respective corner braces are interconnected by a pair of upper side panels 9 and 10 attached to respective corner braces 6 and 7 and extending longitudinally therebetween to form a rectangular-shaped structure.

Pairs of spaced wheels 12 and 13 are mounted on the bottom of the end frame members with pair of wheels 13 being mounted on end panel 5 by an inverted U-shaped tubular metal bracket 15 attached to panel 5 by a plurality of U-bolts 16. An axle 17 is mounted on the bottom ends of bracket 15 and extends horizontally therebetween with wheels 13 being rotatably mounted on the outer ends thereof. Wheels 12 are mounted within the open end of clevises 19 by stub axles 20. Clevises 19 are rotatably mounted on a horizontally extending reinforcing stud brace 21 by swivel bearings 22.

The top of end panels 4–5 and side panels 9–10 are reinforced by a pair of transverse stud braces 24 and 25 and longitudinally extending braces 26 and 27 mounted on the tops of end panels 4–5 and side panels 9–10, respectively. These various braces and panels form a rigid boxlike container 31 movably mounted on wheel pairs 12–13 having a rectangular-shaped open top 29 defined by braces 24–27, with the bottom being closed by a horizontal bottom wall 30. Bottom wall 30 is supported by a pair of transverse cross-braces 32 and 33 (FIG. 4) attached to end panels 4 and 5 and corner braces 6 and 7, respectively.

In accordance with one of the main features of the invention, a pair of sloping hopper-forming end walls 35 and 36 are mounted within the open container 31 and extend transversely between side panels 9 and 10 and between top braces 24 and 25 and bottom wall 30, as shown particularly in FIG. 4. Walls 35 and 36 are mounted within container 31 by two pairs of spaced, triangular-shaped braces 37 and 38, which are mounted against side panels 9 and 10 at the junction with end panels 4 and 5 and bottom wall 30, as shown particularly in FIGS. 1 and 2. The sloping edges of hopper walls 35 and 36 are attached by a plurality of screws 40 to the sloped edges of braces 37 and 38, rigidly mounting the hopper walls in container 31 to form a hopper in combination with the side and bottom wall members. Sloped hopper walls 35–36, together with the intervening vertical portions of side panels 9 and 10, define the hopper, which has a rectangular-shaped top opening corresponding to the open top of container 31.

Walls 35–36 extend downwardly inwardly from top braces 24–25 toward bottom wall 30 and form included angles of approximately 50° with bottom wall 30 (FIG. 4). A circular discharge opening 42 is formed in the center of bottom wall 30 and is located between hopper walls 35–36. Opening 42 is of a predetermined size with respect to bottom wall 30 so that a shelf area 44 (FIG. 1) surrounds opening 42 at the bottom of the hopper. Shelf 44 has an outer rectangular configuration, as shown in FIG. 1. Opening 42 preferably has a diameter of approximately fifteen inches. It is this particular hopper configuration and size opening that enables one of the advantageous features of the invention to be achieved, as described in greater detail below.

A cylindrical collar 46 (FIGS. 4 and 6) having an internal diameter complementary to the diameter of discharge opening 42 is mounted on the bottom surface of bottom wall 30 by a plurality of circumferentially spaced bolts 47. The circular bore or inner opening 48 of collar 46 is vertically aligned with bottom wall discharge opening 42. A circular metal ring, indicated generally at 50 is mounted on the bottom of collar 46 (FIG. 6) by an annular clamping member 51 and bolts 47.

Ring 50 includes a flat annular portion 53, the inner edge of which defines a circular opening 54 which is complementary to discharge opening 42 and collar bore 48. Annular ring portion 53 terminates in a U-shaped, circumferential flange 55. Ring 50 forms a fixed inner member against which the open top end of a collection bag 2 is clamped by an outer expandable clamping ring 57. Clamping ring 57 is an annular metal ring having a U-shaped cross-sectional configuration, as shown in FIG. 6, and a toggle closing mechanism indicated generally at 58 (FIG. 9).

Toggle mechanism 58 is of a usual construction consisting of a toggle lever 59 pivotally mounted on a pin 60 to one end of split clamping ring 57, with a connecting link 61 being pivotally connected by a pin 62 to the other end of ring 57 and pivotally connected by a pin 63 to lever 59. Pivotal movement of lever 59 in a counterclockwise direction about pivot pin 60 moves the split ring ends toward each other, reducing the overall diameter of ring 57 to clamp the upper edges of a bag 2 which has been inserted through ring 57, against the circumferential U-shaped flange 55 of fixed metal ring 50.

A generally U-shaped sheet metal member 65 having a pair of spaced end walls 66 and 67 and a sloped connecting web wall 68 is mounted by a plurality of screws 69 on the bottom of corner braces 6. Member 65 forms a storage compartment in cooperation with the bottom portion of end panel 4 for holding a supply of bags 2, adding to the convenience of the user of the improved bag holder and collector construction 1.

In accordance with one of the main features of the invention, the particular arrangement and configuration of the hopper, which is formed by the combination of sloped walls 35–36, vertical side wall panels 9–10 and horizontal shelf area 44, together with the diameter of discharge opening 42, enables grass clippings, indicated at 70 (FIG. 6), to be readily discharged into a bag 2 mounted on collar 46 by clamping rings 50 and 57, by a relatively small amount of pressure exerted downwardly on the clippings, while enabling the supply of clippings 70 to remain in the hopper after a bag 2 has been filled and is being removed for replacement by another bag 2. It has been found that the grass clippings will remain in the hopper and will not fall in any appreciable quantity through discharge opening 42 during replacement of bag 2 until pressure is exerted on the pile of clippings after a new bag has been installed. This desirable feature is believed to occur due to the particular hopper configuration with the rectangular-shaped shelf area 44 surrounding the circular discharge opening 42.

Furthermore, it has been found that if the grass clippings are dry, they will have a greater tendency to fall through the discharge opening during bag replacement. To correct this problem should it occur, an adjustment plate, indicated generally at 73 (FIG. 8), is placed on bottom hopper wall 30, as shown in FIG. 7. Plate 73 preferably is a flat piece of thin-gauged metal or wood having a rectangular outer configuration complementary to the rectangular configuration of the hopper bottom wall 30. Plate 73 is formed with a rectangular opening 74 which has a smaller opening area than the area of discharge opening 42, as can be seen in FIG. 7. Adjustment plate 73 effectively reduces the discharge opening, enabling the drier grass clippings to remain in the hopper during replacement of a collection bag 2.

Bags 2 preferably are the usual plastic bags in current use today for the collection and storage of all types of materials, such as grass clippings, leaves, twigs, household garbage, etc. One general type of bag has a 33-gallon capacity. The improved construction 1 is so designed that when bag 2 is the 33-gallon size, the bag will be supported on the ground 76 (FIGS. 2 and 3) when mounted beneath the hopper and filled with material. This prevents undue strain at the point of clamping engagement on collar 46 when the bag is filled, yet enables the complete available storage capacity of the bag to be utilized.

Another feature of the invention is the compact configuration thereof in which the width of the hopper, due to the side panels being vertical and not sloped, as in prior hoppers, is only slightly greater in the transverse direction than the discharge opening. This enables the toggle mechanism 58 of clamping ring 57 to be located at an easily accessible position on the side of the hopper, eliminating a user from reaching beneath the hopper when replacing a bag 2. Also, the completely open area beneath the hopper and between the supporting end panels and braces, as shown in FIG. 2, permits a filled bag to be removed easily therefrom by unclamping toggle mechanism 58 and sliding the filled bag from beneath the hopper. The bag need not be lifted in any manner for its removal, as in prior constructions. A new or empty bag 2 is installed easily by inserting it through opened ring 57 which has been removed from its mating ring 50, with the top end of the bag being slightly turned over the ring. Ring 57 then is placed in position adjacent ring 50 and toggle lever 59 moved to a closed position securely clamping the bag top completely about its circumference between rings 50 and 57. This complete circumferential clamping prevents tearing or stretching of the plastic bags which may occur if supported only at several points, as in some prior art bag holder constructions.

Accordingly, the improved bag holder and collector construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved bag holder and collector is constructed and used, the characteristics of the construction, and the advantageous, new and useful results obtained; the new and useful structures, devices, elements, arrangements, parts, and combinations, are set forth in the appended claims.

I claim:

1. An improved bag holder and collector construction including:
   (a) a frame;
   (b) wheels movably supporting the frame;
   (c) hopper means mounted on the frame for receiving a supply of grass clippings therein, said hopper means having a pair of spaced, downwardly inwardly sloping end walls, a pair of intervening, generally vertical, side walls, and a relatively flat horizontal bottom wall, with a circular discharge opening having a diameter of approximately fifteen inches being formed in said bottom wall, said bottom wall forming a horizontal shelf area generally surrounding the discharge opening;
   (d) cylindrical collar means mounted beneath the bottom wall opening for removably mounting a bag on the hopper means for receiving grass clippings discharged through said bottom wall opening;
   (e) band means cooperatively engageable with the collar means for removably clamping a bag on said collar means; and
   (f) said horizontal shelf area surrounding said circular discharge opening and the configuration of said sloping end walls and said vertical side walls serving to restrain grass clippings through said discharge opening during replacement of bags.

2. The construction defined in claim 1 in which the frame includes a pair of spaced, parallel, upstanding end panels; in which the bumper means side walls extend longitudinally between and are connected to the end panels, with said end panels and side walls forming a rectangular-shaped top hopper means opening.

3. The construction defined in claim 2 in which a pair of wheels is mounted on the bottom of each end panel.

4. The construction defined in claim 2 in which a generally U-shaped sheet metal member is mounted on one of the end panels forming a storage receptacle for additional collection bags.

5. The construction defined in claim 1 in which the hopper means sloped end walls form exterior angles of approximately 130° with the bottom wall.

6. The construction defined in claim 1 in which a discharge opening adjustment plate has an outer configuration complementary to the hopper bottom wall and is mounted on said bottom wall; in which a rectangular opening is formed in the adjustment plate and is vertically aligned with the bottom wall opening; and in which said adjustment plate opening has an area less than the opening area of the bottom wall opening to reduce the discharge rate of grass from the hopper means into a bag mounted below.

* * * * *

UNITED STATES PATENT AND TRADEMARK OFFICE
CERTIFICATE OF CORRECTION

PATENT NO. : 4,240,474
DATED : December 23, 1980
INVENTOR(S) : Harold W. Perkins It is certified that error appears in the above-identified patent and that said Letters Patent are hereby corrected as shown below:

Column 8, line 11, change "bumper" to -hopper-

Signed and Sealed this

Seventeenth Day of March 1981

[SEAL]

Attest:

RENE D. TEGTMEYER

Attesting Officer    Acting Commissioner of Patents and Trademarks